US010549397B1

(12) United States Patent
Aldridge

(10) Patent No.: US 10,549,397 B1
(45) Date of Patent: Feb. 4, 2020

(54) DYNAMIC CONVEYOR CONTROL SYSTEM

(71) Applicant: HAAS AUTOMATION, INC., Oxnard, CA (US)

(72) Inventor: Jacob Steven Aldridge, Camarillo, CA (US)

(73) Assignee: HAAS AUTOMATION, INC., Oxnard, CA (US)

( * ) Notice: Subject to any disclaimer, the term of this patent is extended or adjusted under 35 U.S.C. 154(b) by 85 days.

(21) Appl. No.: 15/847,701

(22) Filed: Dec. 19, 2017

(51) Int. Cl.
| G06F 19/00 | (2018.01) |
| B23Q 15/22 | (2006.01) |
| B65G 43/00 | (2006.01) |
| G05B 19/31 | (2006.01) |

(52) U.S. Cl.
CPC ........... *B23Q 15/225* (2013.01); *B65G 43/00* (2013.01); *G05B 19/31* (2013.01); *B23Q 2717/00* (2013.01); *G05B 2219/50397* (2013.01)

(58) Field of Classification Search
CPC .............................................. H01L 21/67276
USPC ........................................................ 700/112
See application file for complete search history.

(56) References Cited

U.S. PATENT DOCUMENTS

| 3,430,751 | A |   | 3/1969  | Bateson |   |
|-----------|---|---|---------|---------|---|
| 5,189,624 | A | * | 2/1993  | Barlow  | G05B 19/182 |
|           |   |   |         |         | 700/169 |
| 6,081,986 | A | * | 7/2000  | Miyano  | B23Q 1/0027 |
|           |   |   |         |         | 29/563 |
| 6,315,106 | B1 | * | 11/2001 | Hirano | B23Q 11/0042 |
|           |   |   |         |         | 198/542 |
| 8,073,599 | B2 |   | 12/2011 | Goering et al. |   |
| 8,630,732 | B2 | * | 1/2014  | Tolkmitt | G05B 15/02 |
|           |   |   |         |         | 700/178 |
| 2001/0047701 | A1 | * | 12/2001 | Nakai | B23Q 1/66 |
|           |   |   |         |         | 82/117 |
| 2013/0103180 | A1 | * | 4/2013  | Tolkmitt | G05B 19/4061 |
|           |   |   |         |         | 700/114 |
| 2014/0223711 | A1 | * | 8/2014  | Feichtl | B23Q 39/02 |
|           |   |   |         |         | 29/56.5 |
| 2014/0309766 | A1 | * | 10/2014 | Kunimitsu | G05B 19/19 |
|           |   |   |         |         | 700/192 |

(Continued)

FOREIGN PATENT DOCUMENTS

JP      2005138259 A   *   6/2005

OTHER PUBLICATIONS

Kikuchi et al, English translation of JP2005138259A, 2005, pp. 4 (Year: 2005).*

*Primary Examiner* — Suresh Suryawanshi
(74) *Attorney, Agent, or Firm* — Morgan, Lewis & Bockius LLP

(57) ABSTRACT

A conveyor in a machine tool system is dynamically controlled. A volume of material to be conveyed by the conveyor is iteratively determined. During each iteration, a current position of a tool is determined. An intersection of a tool model representing the tool at the current position and a workpiece model representing a workpiece is determined and a nominal volume of material removed from the workpiece by the tool based on the intersection of the tool model and the workpiece model is determined. The volume of material to be conveyed is updated based on the nominal volume of material removed from the workpiece and an operating state of the conveyor. The operating state of the conveyor is controlled based on the updated volume of material to be conveyed.

21 Claims, 5 Drawing Sheets

(56) References Cited

U.S. PATENT DOCUMENTS

2016/0176002 A1\* 6/2016 Grob ................... B23Q 1/4804
409/185
2017/0308055 A1\* 10/2017 Hoshino .............. G05B 19/409

\* cited by examiner

DYNAMIC CONVEYOR CONTROL SYSTEM

BACKGROUND

Computer numerical control ("CNC") machine tools are operated based on a sequence of commands or instructions in a machining program to shape a workpiece. When executed, the commands or instructions cause the CNC machine tool to position a tool relative to a workpiece and move the tool or the workpiece relative to each other to remove material from the workpiece to shape the workpiece. The machining program may be executed repeatedly on a CNC machine tool to generate multiple, identically shaped workpieces. During operation of the CNC machine tool, the material removed from the workpiece by the tool must be removed from the CNC machine tool to provide freedom of movement and avoid damaging moving components of the CNC machine tool. Conveyors, such as belts or augers, may be utilized to convey the removed material from the CNC machine tool for disposal or recycling.

SUMMARY

According to aspects of the subject technology, a method of dynamic conveyor control in a machine tool system is provided. The method includes iteratively determining a volume of material to be conveyed by a conveyor, where each iteration includes determining a current position of a tool, determining an intersection of a tool model representing the tool at the current position and a workpiece model representing a workpiece, and determining a nominal volume of material removed from the workpiece by the tool based on the intersection of the tool model and the workpiece model. Each iteration further includes updating the volume of material to be conveyed based on the nominal volume of material removed from the workpiece and an operating state of the conveyor. The operating state of the conveyor is controlled based on the updated volume of material to be conveyed.

According to further aspects of the subject technology, a non-transitory processor-readable storage medium storing instructions that, when executed by a processor, perform a method of dynamic conveyor control is provided. The method includes iteratively determining a volume of material to be conveyed by a conveyor, where each iteration includes determining a current position of a tool, determining an intersection of a tool model representing the tool at the current position and a workpiece model representing a workpiece, and determining a nominal volume of material removed from the workpiece by the tool based on the intersection of the tool model and the workpiece model. Each iteration further includes updating the volume of material to be conveyed based on the nominal volume of material removed from the workpiece and an operating state of the conveyor. The operating state of the conveyor is controlled based on the updated volume of material to be conveyed.

According to further aspects of the subject technology, a machine tool control system is provided that includes a processor-readable storage medium storing instructions and processor circuitry configured to execute the instructions stored in the processor-readable storage medium to perform a method of dynamic conveyor control. The method includes iteratively determining a volume of material to be conveyed by a conveyor, where each iteration includes determining a current position of a tool, determining an intersection of a tool model representing the tool at the current position and a workpiece model representing a workpiece, and determining a nominal volume of material removed from the workpiece by the tool based on the intersection of the tool model and the workpiece model. Each iteration further includes updating the volume of material to be conveyed based on the nominal volume of material removed from the workpiece and an operating state of the conveyor. The operating state of the conveyor is controlled based on the updated volume of material to be conveyed.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
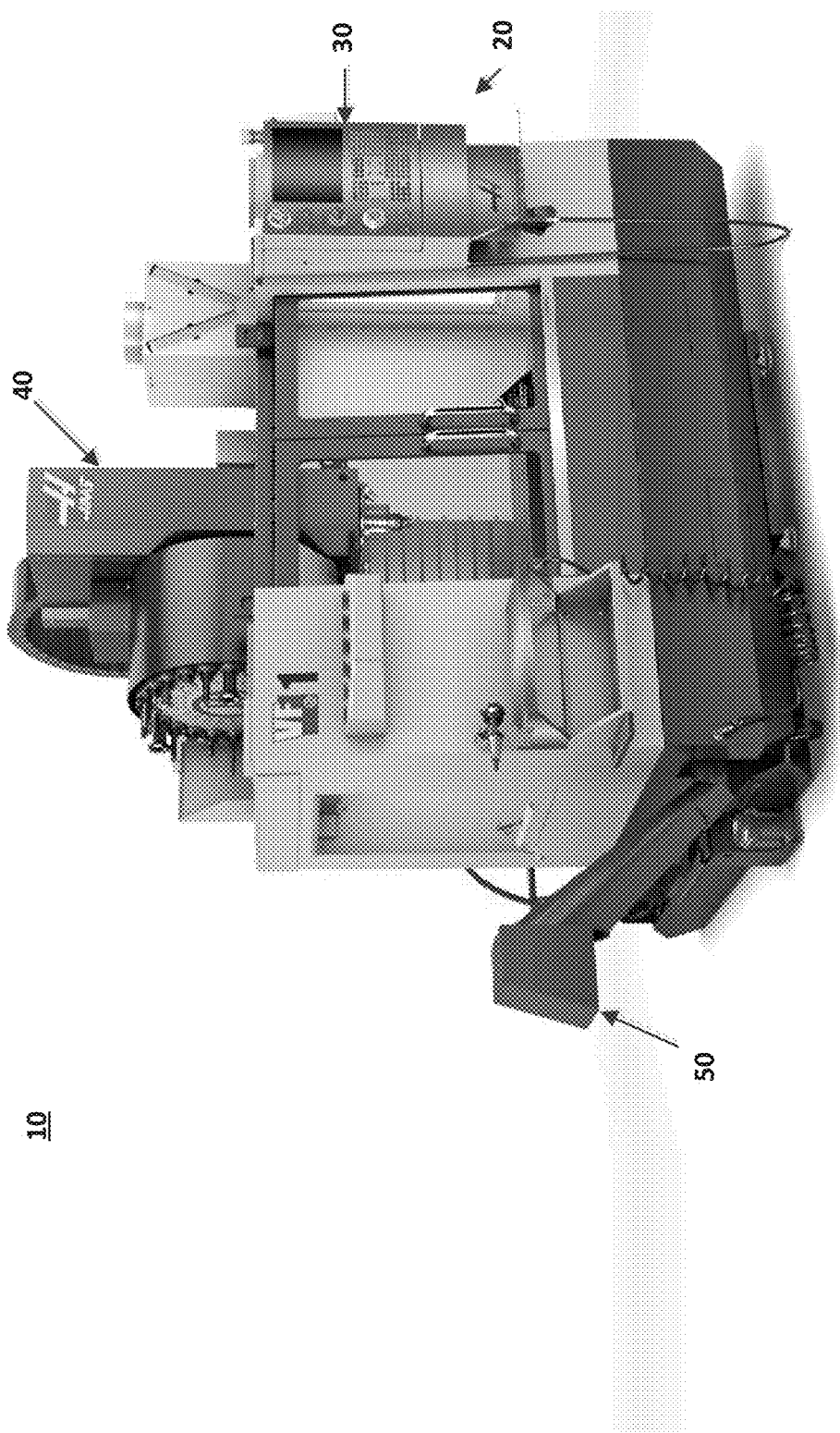
FIG. 1 illustrates a CNC machine tool according to aspects of the subject technology.

FIG. 1 illustrates a CNC machine tool according to aspects of the subject technology. CNC machine tool 10 includes a machine tool control system 20, a user interface 30, a machine tool 40, and a conveyor 50. The user interface 30 allows an operator to load and execute a machining program (e.g., G-code program) into the machine tool control system 20 and control execution of the machining program to shape a workpiece using machine tool 40. As material is removed from the workpiece by machine tool 40, machine tool control system 20 operates the conveyor 50 to remove that material from CNC machine tool 10.

Conveyor 50 may be run at a pre-programmed on/off cycle time while machine tool 40 is in motion removing material from the workpiece. However, running conveyor 50 at a constant on/off cycle time is not optimal. For example, machine tool 40 may not always be removing material while in motion or may be removing relatively small amounts of material. Operating conveyor 50 regardless of the amount of material being removed by machine tool 40 wastes power and adds unnecessary wear to conveyor 50. On the other hand, operating conveyor 50 using a constant on/off cycle time may result in chip jams in conveyor 50 when the on/off cycle time is insufficient to keep up with a pace of material removal by machine tool 40 during heavy cutting motions.

The subject technology utilizes three-dimensional modeling of the workpiece and machine tool 40 to determine a nominal volume of material removed from the actual workpiece by machine tool 40 and controls an operating state of conveyor 50 based on this determination. The modeling of the workpiece and machine tool 40 may be based on parameters entered into machine tool control system 20 or obtained from instructions within the machining program being executed. The nominal volume of material represents an expected or estimated volume of material removed from the workpiece based on the dimensions of the workpiece, the dimensions of a cutting surface of machine tool 40, and the trajectory of machine tool 40 with respect to the workpiece specified by the machining program instructions. Iteratively updating an amount of material that needs to be conveyed away from CNC machine tool 10 using models of the workpiece and machine tool 40 as a machining program is executed provides a control input to dynamically control the operating state of conveyor 50 that both saves power and reduces the risk of chip jams in conveyor 50. This dynamic control of conveyor 50 is described in more detail below.

The dynamic conveyor control described herein is not limited to any particular type of CNC machine tool 10 or conveyor 50. For example, CNC machine tool 10 may be a mill or a lathe machine tool in either a vertical or horizontal configuration. CNC machine tool 10 may have a single axis of motion or multiple axes of motion (two, three, four, etc.) by which to control motion/positioning of either the workpiece or machine tool 40. Conveyor 50 represents mechanisms configured to move or convey removed material (e.g., chips) away from the moving components of CNC machine tool 10. Conveyor 50 may use a belt mechanism or an auger mechanism, for example, to convey the material.

The workpiece may be any type of material such as metal, wood, plastic, glass, etc. The implement/tool of machine tool 40 may be any type of implement/tool appropriate for removing the type of material of the workpiece. For example, the implement/tool may be a cutting implement, a grinding implement, or an electrical discharge implement. In addition, the CNC machine tool 10 may exchange implements/tools during execution of a machining program to allow for different types/rates of material removal and/or finish work to be performed on a workpiece.

Figure 2:
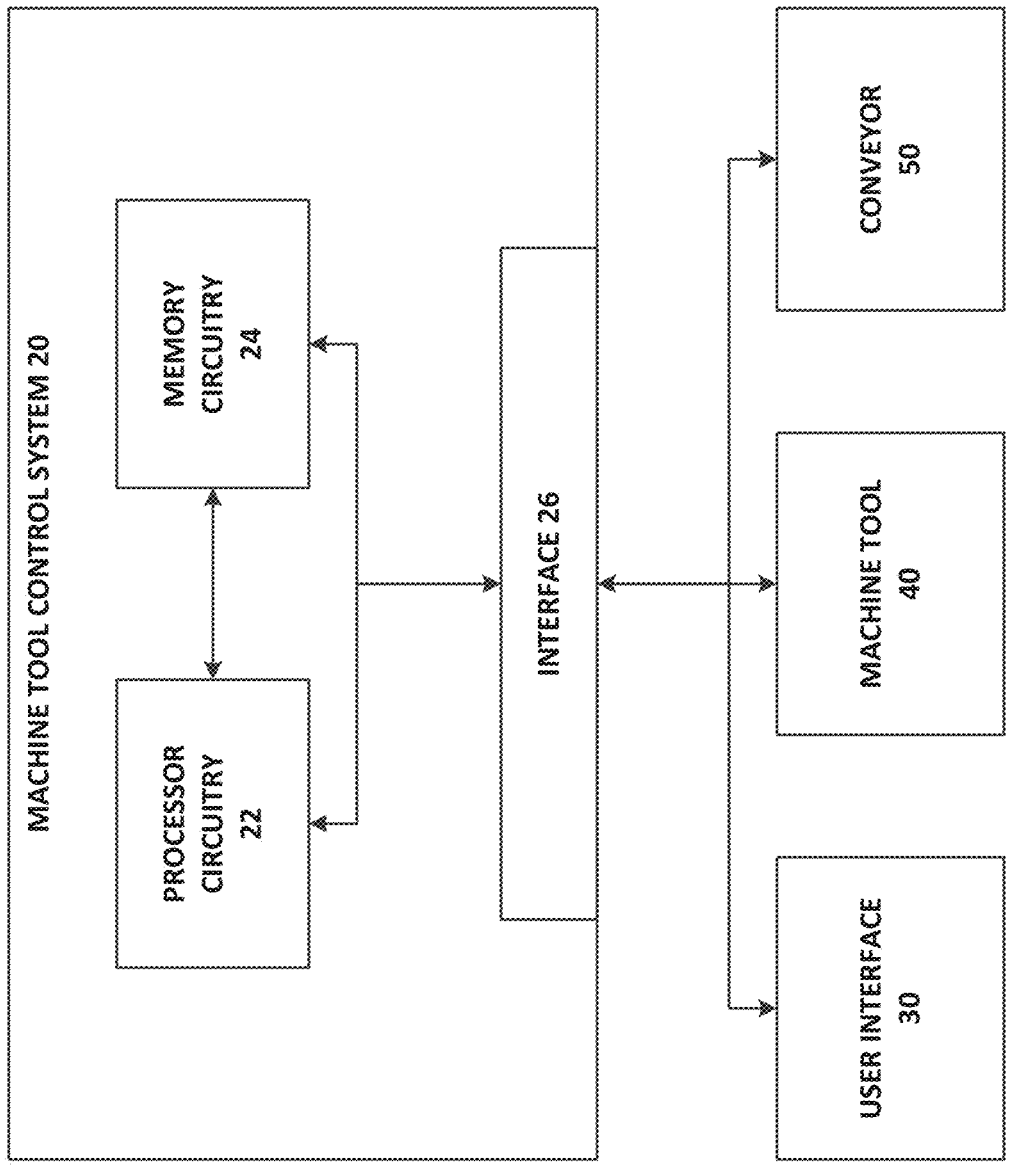
FIG. 2 is a block diagram illustrating components of CNC machine tool 10 according to aspects of the subject technology.

FIG. 2 is a block diagram illustrating components of CNC machine tool 10 according to aspects of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

Machine tool control system 20 may include processor circuitry 22, memory circuitry 24, and interface 26. The components may be connected to one another using one or more buses for communicating power, data, and/or control signals both within machine tool control system 20 and between machine tool control system 20 and user interface 30, machine tool 40, and conveyor 50. Processor circuitry 22 may be a system on a chip (SoC), a multi-core advanced reduced instruction set computing (RISC) machine (ARM) processor, and/or generally any single/multi-core processor. Memory circuitry 24 may include one or more dynamic random access memory (DRAM) modules, one or more electronic solid-state memory modules (e.g., flash memory), a magnetic medium storage device, an optical medium storage device, or any combination of the foregoing non-transitory, processor-readable storage media.

Interface 26 may include physical and electrical connectors configured to communicate data and control signals between machine tool control system 20 and user interface 30. According to aspects of the subject technology, user interface 30 may include one or more display devices for displaying information to a user/operator of CNC machine tool 10. User interface 30 also may include one or more mechanisms for receiving user input to program/control CNC machine tool 10, select machining programs for execution by the machine tool control system 20, etc. The mechanisms may include key panels, either physical or virtual displayed on a display device, pointer mechanisms such as mouse, stylus, trackball, etc. User interface 30 also may include interfaces for connecting computer-readable media such as flash drives for loading programs into the machine tool control system 20, downloading operation logs, etc.

Interface 26 also may include physical and electrical connectors configured to communicate data and control signals between machine tool control system 20 and machine tool 40. Interface 26 may include or communicate with axis drivers and feedback encoders associated with machine tool 40. Each axis driver effects motion along or around a respective axis. The axis driver may position an implement/tool, a workpiece, or both along or around one or more axes. For example, two axis drivers may be used to position a workpiece linearly along two respective perpendicular axes, a third axis driver may be used to position a tool linearly along a third axis orthogonal to the two perpendicular axes, and a fourth axis driver may be used to rotate the tool around the third axis to cause material removal from the workpiece according to a program.

The axis drivers represent mechanical, electro-mechanical, hydraulic, etc. systems configured to effect motion along or around a respective axis. The axis drivers may include servo motors, stepper motors, actuators, etc. The axis drivers may include both the mechanical components as well as the electrical components configured to drive the mechanical components based on an amount of current/voltage/power applied to the components.

The feedback encoders represent encoders configured to detect movement along or around respective axes effected by the axis drivers. The feedback encoder may detect linear motion or rotational motion using optical detectors, magnetic detectors, etc. The detected motion may be used to determine a position of the workpiece and/or tool. The detected motion also may be used to determine a speed of the motion. The feedback encoders provide axis feedback data used to generate axis control data used to control the axis drivers. The feedback encoders may be incorporated into the axis drivers, or may be separate from the axis drivers.

Interface 26 also may include physical and electrical connectors configured to communicate control signals to conveyor 50. The control signals set an operating state of conveyor 50. The operating state may be a running state, in which the belt or auger of conveyor 50 is in motion to convey removed material from CNC machine tool 10, or an idle state, in which the belt or auger is not in motion. The running state may be fixed or variable. For example, the speed at which the belt or auger is operated may be varied based on a control signal from machine tool control system 20 to vary a rate of removal at which conveyor 50 conveys the material.

Processor circuitry 22 may be configured to load sequences of instructions from memory circuitry 24, or other processor-readable storage media accessible to processor circuitry 22, and execute the sequences of instructions to manage operation of the components of CNC machine tool 10. The sequences of instructions may include machining programs used to shape a workpiece, an operating system for managing the processor and memory resources within machine tool control system 20, drivers for controlling and communicating with user interface 30, machine tool 40, and conveyor 50, safety systems for monitoring the operations of CNC machine tool 10 and alerting a user/operator with current states and or potential safety concerns during operation of CNC machine tool 10. The operations described herein also may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), software, or a combination of both.

Figure 3:
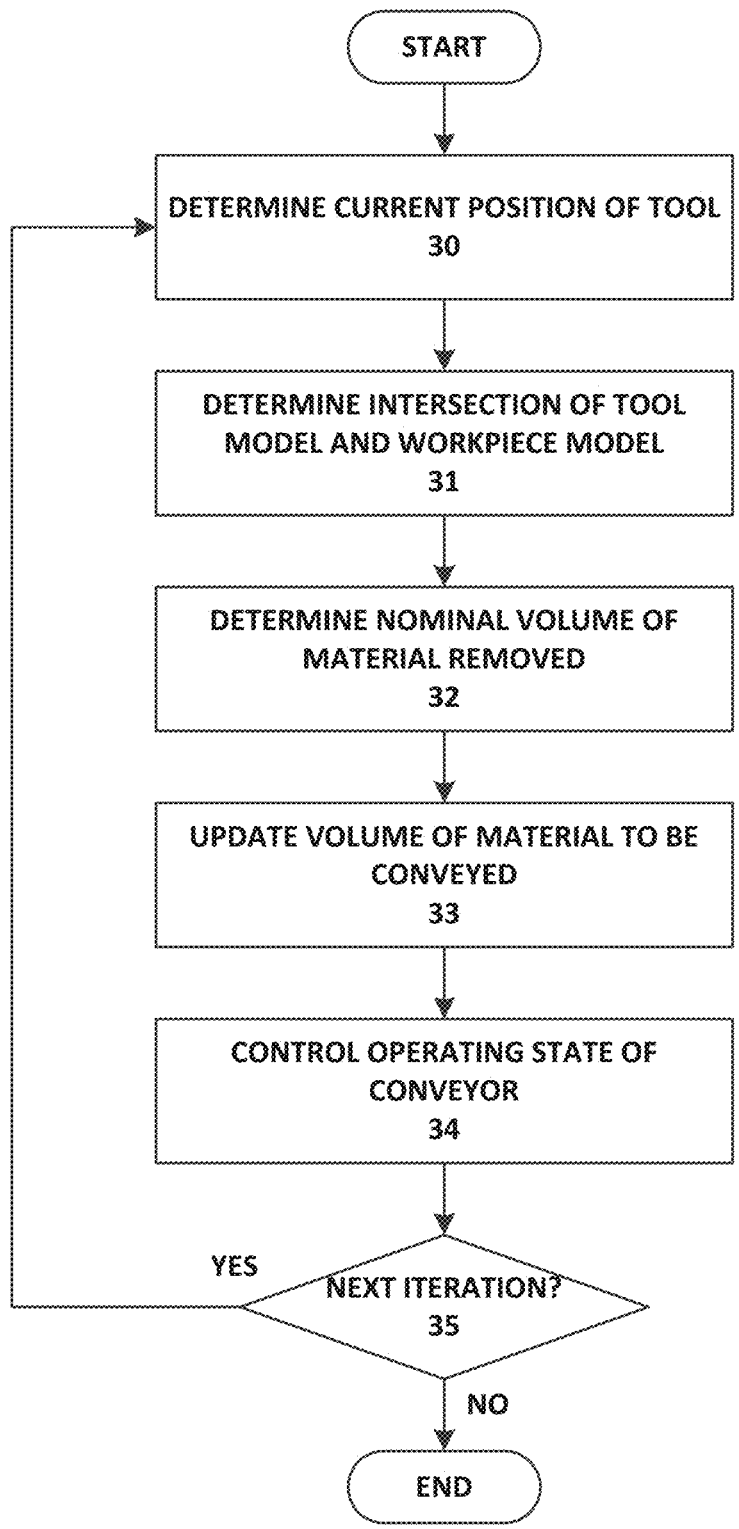
FIG. 3 is a flowchart illustrating a dynamic conveyor control process according to aspects of the subject technology.

FIG. 3 is a flowchart illustrating a dynamic conveyor control process according to aspects of the subject technology. The dynamic conveyor control process may be executed by machine tool control system 20 in parallel with a machining program selected for execution to shape a workpiece. Prior to execution of the dynamic conveyor control process, modeling parameters are provided to a modeling module executed by processor circuitry 22. In particular, modeling parameters for the workpiece to be shaped and the tools/implements to be used by machine tool 40 to shape the workpiece are provided to the modeling module via user interface 30, for example.

A three-dimensional model is generated to represent the workpiece during execution of the machining program. When a workpiece is loaded into CNC machine tool 10, the dimensions and location of the workpiece within a coordinate space are entered as modeling parameters. Using the dimensions and location of the workpiece, the modeling module generates a three-dimension representation of the workpiece as a workpiece model. According to aspects of the subject technology, an octree may be used as the workpiece model. The resolution or size of the elements of the octree model may be set based on different considerations. For example, if the resolution is too fine the processing load of generating the model and running the dynamic conveyor control process may be high and negatively impact other operations of machine tool control system 20. If the resolution is too coarse, the nominal or estimated volume of material determined using the model may be inaccurate resulting in the control of conveyor 50 being misaligned with the actual volume of material removed from the workpiece. The size of the tool/implement of machine tool 40 used to remove material and/or a depth within the workpiece that machine tool 40 is expected to traverse during each trajectory of machine tool 40 dictated by the machining program may be taken into account. For example, the resolution may be set to $mm^3$ for fine machining programs and workpiece features or $cm^3$ for larger dimension machining programs and workpiece features. The resolution may be configurable by the user/operator when selecting the machining program and setting up CNC machine tool 10 for execution of the machining program.

Similarly, a three-dimensional model is generated to represent the cutting tool/implement of machine tool 40. The modeling parameters for the tool/implement may include a cross-sectional area corresponding to a cutting surface of the tool/implement during operation of machine tool 40. For example, the modeling parameter for a drill bit may be the diameter of the bit. For non-rotating tools/implements, the modeling parameters may include a cross-sectional shape other than a circle that corresponds to the shape of the tool/implement. To simplify the processing involved in the dynamic conveyor control process, the tool model may be generalized using a square shape that is closest in size to the cross-sectional area of the cutting tool/implement.

The dynamic conveyor control process is an iterative process that executes in parallel with the machining program executed to process and shape the workpiece. The iterative process uses the workpiece model and the tool model generated by the modeling module to dynamically control the operating state of conveyor 50. During each iteration, a current position of the tool is determined (block 30), an intersection of the tool model and the workpiece model is determined (block 31), and a nominal volume of material removed from the workpiece by the tool is determined based on the intersection (block 32). A volume of material to be conveyed by conveyor 50 is updated based on the determined nominal volume of material and an operating state of conveyor 50 (block 33), and the operating state of conveyor 50 is controlled based on the updated volume of material (block 34).

Figure 4:
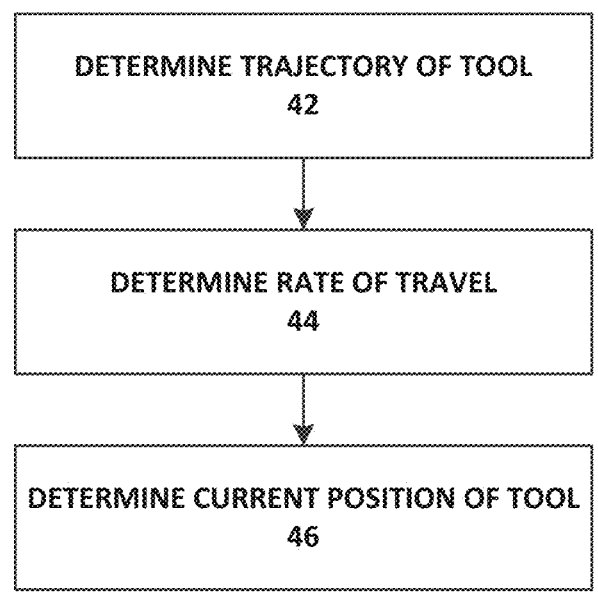
FIG. 4 is a flowchart illustrating a process for determining a current position of the tool/implement according to aspects of the subject technology.

FIG. 4 is a flowchart illustrating a process for determining a current position of the tool/implement (block 30 in FIG. 3) during each iteration of the control process according to aspects of the subject technology. The process includes determining a trajectory of the tool (block 42), determining a rate of travel of the tool (block 44), and determining a current position of the tool along the trajectory based on the rate of travel (block 46). While the elements in FIG. 4 are depicted and described serially, one or more of the elements may be performed concurrently with the other elements.

Machining programs (e.g., G-code) define endpoints or waypoints in the coordinate space of the workpiece through which the tool is operated to remove material from the workpiece. A trajectory of the tool may be determined based on pairs of endpoints extracted from the G-code (block 42). For example, an endpoint of a first command in the machining program may be used as an initial point in the trajectory and an endpoint of a second command, following the first command, may be used as a final point in the trajectory. The trajectory may be represented by a straight line between the initial point and the final point. The trajectory also may be represented by a curved line defined by one or more positioning commands in the machining program.

A rate of travel between the endpoints of the trajectory may be determined from the machining program instructions (block 44). The rate of travel may be explicitly defined in positioning commands of the machining program or may be determined based on the endpoints and a rate of executing the machining program. Using the trajectory and the determined rate of travel, the current position of the tool along the trajectory in the coordinate space of the workpiece is determined (block 46). According to aspects of the subject technology, multiple iterations of the dynamic conveyor control process may be executed while the tool of machine tool 40 traverses each trajectory. Accordingly, the trajectory and rate of travel may be determined once for each trajectory and that information reused during each iteration to track the movement of the tool along the trajectory based on the determined current position of the tool during the last iteration.

Returning to FIG. 3, with the current position of the tool in the coordinate space of the workpiece, an intersection of the tool model at the current position and the workpiece model is determined (block 31). The tool model may be updated to define a volume in space based on the cross-sectional area defined in the tool model and a distance traveled by the tool during the current iteration. The elements of the workpiece model volume (e.g., octree) may be traversed and the elements of the workpiece model that share coordinates with portions of the tool model volume at the determined current position may be flagged.

The flagged elements of the workpiece model may be removed from the model and aggregated to determine a nominal volume of material removed from the workpiece by the tool during the duration of the iteration (block 32). Each element of the workpiece model represents a volume of material. Adding the number of flagged elements provides an approximation of the amount of actual material removed from the workpiece by the tool. Removing the flagged elements from the workpiece model provides an approximation of the remaining volume of the workpiece, which is used during the next iteration to determine the intersection of the tool model and the workpiece model.

Figure 5:
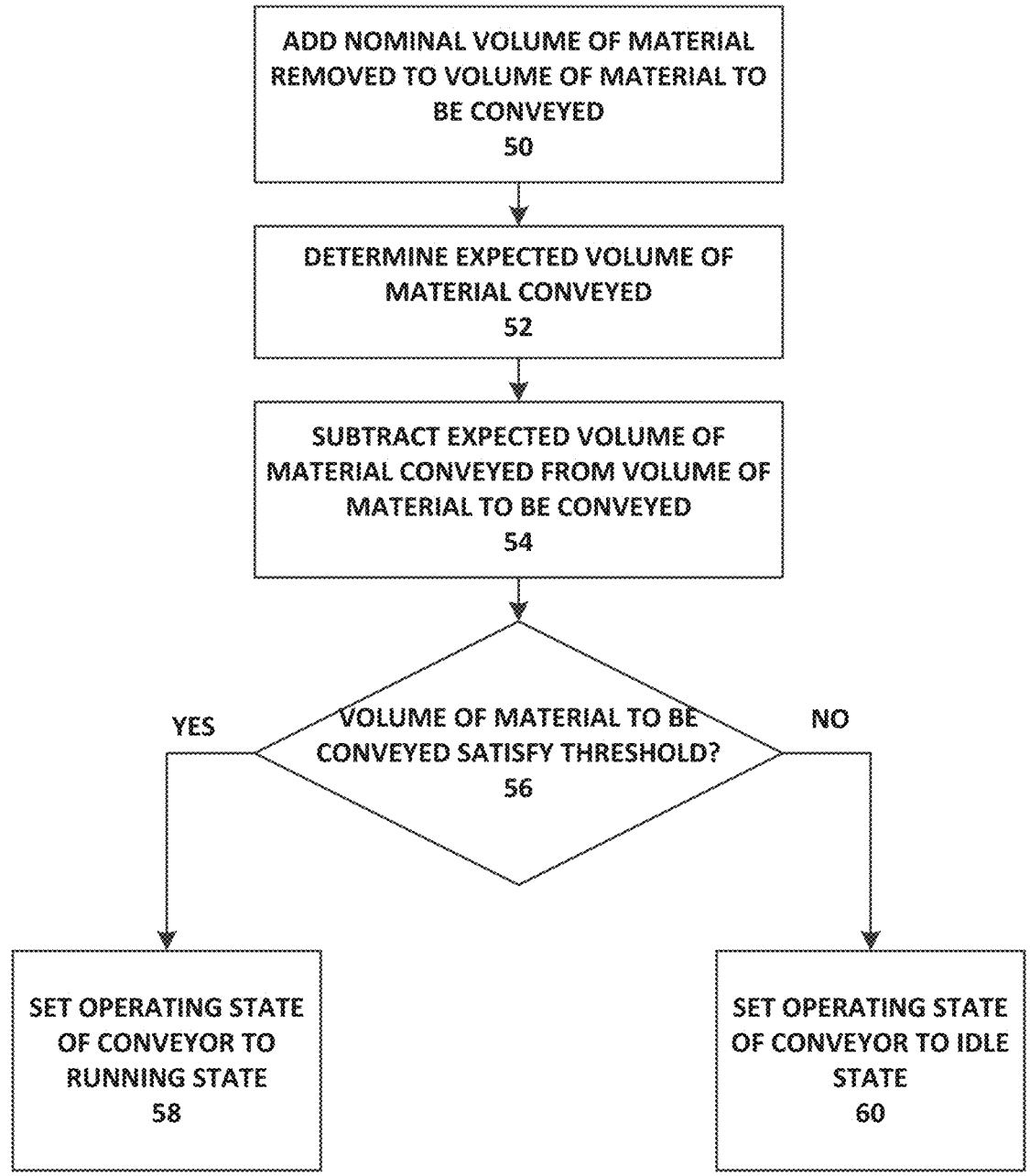
FIG. 5 is a flowchart illustrating a process for updating the volume of material to be conveyed and controlling the operating state of the conveyor according to aspects of the subject technology.

The dynamic conveyor control process maintains a volume of material to be conveyed by conveyor 50 during the process steps. During each iteration, this volume of material to be conveyed is updated (block 33) and the operating state of conveyor 50 is controlled based on the updated volume of material to be conveyed. FIG. 5 is a flowchart illustrating a process for updating the volume of material to be conveyed and controlling the operating state of conveyor 50 according to aspects of the subject technology. While elements of FIG. 5 are depicted and described serially, one or more of the elements may be performed concurrently with the other elements.

During each iteration, the volume of material to be conveyed by conveyor 50 is updated by an integrator module executed by machine tool control system 20 based on the determined nominal volume of material removed from the workpiece and an expected volume of material already conveyed by conveyor 50. Specifically, the integrator module adds the nominal volume of material removed from the workpiece, as determined in block 32 of FIG. 3, to the volume of material to be conveyed (block 50 in FIG. 5).

An expected volume of material conveyed out of CNC machine tool 10 by conveyor 50 may be determined during each iteration (block 52). The expected volume of material conveyed may be based on a removal rate of conveyor 50 and the operating state of conveyor 50 during the iteration. Conveyor 50 may have a specified capacity of material that can be removed per unit time, indicated as a specified removal rate. The removal rate may be based on the dimensions of the mechanisms of conveyor 50 that physically move the removed material. For example, the dimensions of a conveyor belt or the diameter and spacing of an auger. Combining the dimensions of the conveyance mechanism with the rate at which the conveyance mechanism is operated, may define the removal rate for conveyor 50. The removal rate of conveyor 50 may be provided as an input to the dynamic conveyor control process. Multiplying the removal rate of conveyor 50 by the period of time during which conveyor 50 was in a running state during the iteration provides an expected volume of material conveyed by conveyor 50 during the iteration. The integrator module subtracts the expected volume of material conveyed from the volume of material to be conveyed (block 54).

The updated volume of material to be conveyed, updated based on the nominal volume of material removed from the workpiece and the expected volume of material removed by conveyor 50, represents the accumulation of waste material (e.g., chips) in CNC machine tool 10 during execution of a machining program. The operating state of conveyor 50 is controlled based on this value (block 34 in FIG. 3). For example, the updated volume of material to be conveyed may be compared against a threshold value (block 56 in FIG. 5). If the updated volume of material to be conveyed satisfies the threshold value, the operating state of conveyor 50 may be set to a running state which causes conveyor 50 to remove the waste material from the machine tool (block 58). If the updated volume of material to be conveyed does not satisfy the threshold value, the operating state of conveyor 50 may be set to an idle state which does not remove any waste material from the machine tool (block 60).

The threshold value may be a configuration parameter set by the user/operator when initiating execution of a machining program. The threshold value may be set to zero so that conveyor 50 may be set to a running state when any waste material is expected to be ready for conveyance based on the updated volume of material to be conveyed being greater than zero. Alternatively, a value greater than zero may be used as the threshold value so that conveyor 50 remains in an idle state until a minimum amount of waste material has accumulated, where the minimum amount is represented by the threshold value.

The operating state of conveyor 50 may include only two states, a running state and an idle state, that represent a simple on-off operation of conveyor 50. Alternatively, the running state of conveyor 50 may be variable to increase or decrease a rate of removal by adjusting a speed of operation of the conveyance mechanism. The speed of operation of the conveyance mechanism may be set by machine tool control system 20 in proportion to the updated volume of material to be conveyed using a function for continuous variation of the speed or defined tiers for stepped variation of the speed where conveyor 50 may have variable or specified speeds of operation that may be selected.

Returning to FIG. 3, the dynamic conveyor control process determines whether to execute another iteration and either returns to block 30 or ends based on the determination (block 35). The determination may be based on whether the machining program has completed execution and the processing of the workpiece has completed. For example, machine tool control system 20 may control the operating state of conveyor 50 based on the updated volume of material to be conveyed as long as a machining program is being executed.

The time step of each iteration may be a configuration parameter set by a user/operator. The time step of each iteration impacts the processes described above as a longer time step possibly results in larger jumps in material to be conveyed before the process reaches the decision point on setting the operating state of conveyor 50. Because a number of operations must be performed by machine tool control system 20 during each iteration, the processing capacity of processor circuitry 22 may put a lower limit on the duration of the time step. Accordingly, the time step may be set by the user/operator to balance avoid large jumps in material to be conveyed accumulating and possibly leading to chips with exceeding the processing capability of processor circuitry 22.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method of dynamic conveyor control in a machine tool system, the method comprising:
   iteratively determining a volume of material to be conveyed by a conveyor, wherein each iteration of a plurality of iterations comprises:
   determining a current position of a tool;
   determining an intersection of a tool model representing the tool at the current position and a workpiece model representing a workpiece;
   determining a nominal volume of material removed from the workpiece by the tool based on the intersection of the tool model and the workpiece model; and
   updating the volume of material to be conveyed based on the nominal volume of material removed from the workpiece and an operating state of the conveyor; and
   controlling the operating state of the conveyor based on the updated volume of material to be conveyed, wherein controlling the operating state of the conveyor comprises:
   comparing the undated volume of material to be conveyed to a threshold value;
   setting the operating state of the conveyor to a running state if the updated volume of material to be conveyed satisfies the threshold value; and
   setting the operating state of the conveyor to an idle state if the updated volume of material to be conveyed does not satisfy the threshold value.

2. The method of claim 1, wherein updating the volume of material to be conveyed comprises:
   adding the nominal volume of material removed from the workpiece to the volume of material to be conveyed;
   determining an expected volume of material conveyed based on the operating state of the conveyor and a removal rate of the conveyor; and
   subtracting the expected volume of material conveyed from the volume of material to be conveyed.

3. The method of claim 1, wherein the set running state is a variable running state determined as a function of the updated volume of material to be conveyed, and
   wherein the running state comprises a rate of removal.

4. The method of claim 1, wherein determining the current position of the tool comprises:
   determining a trajectory of the tool based on a plurality of endpoints determined from a machining program;
   determining a rate of travel of the tool from the machining program; and
   determining the current position of the tool based on a previous position of the tool, the determined trajectory, and the determined rate of travel of the tool.

5. The method of claim 1, further comprising:
   receiving dimension and position parameters for the workpiece; and
   generating the workpiece model based on the received dimension and position parameters.

6. The method of claim 5, wherein the generated workpiece model is a three-dimensional model comprising a plurality of elements, and
   wherein each iteration of the plurality of iterations further comprises updating the workpiece model by removing one or more elements of the plurality of elements based on the determined intersection of the tool model and the workpiece model.

7. The method of claim 1, further comprising:
   receiving tool parameters for the tool; and
   generating the tool model based on the received tool parameters.

8. A non-transitory processor-readable storage medium storing instructions that, when executed by a processor, perform a method of dynamic conveyor control comprising:
   iteratively determining a volume of material to be conveyed by a conveyor, wherein each iteration of a plurality of iterations comprises:
   determining a current position of a tool;
   determining an intersection of a tool model representing the tool at the current position and a workpiece model representing a workpiece;
   determining a nominal volume of material removed from the workpiece by the tool based on the intersection of the tool model and the workpiece model; and
   updating the volume of material to be conveyed based on the nominal volume of material removed from the workpiece and an operating state of the conveyor; and
   controlling the operating state of the conveyor based on the updated volume of material to be conveyed, wherein controlling the operating state of the conveyor comprises:
   comparing the updated volume of material to be conveyed to a threshold value;

setting the operating state of the conveyor to a running state if the updated volume of material to be conveyed satisfies the threshold value; and setting the operating state of the conveyor to an idle state if the updated volume of material to be conveyed does not satisfy the threshold value.

9. The non-transitory processor-readable storage medium of claim 8, wherein updating the volume of material to be conveyed comprises:

adding the nominal volume of material removed from the workpiece to the volume of material to be conveyed;

determining an expected volume of material conveyed based on the operating state of the conveyor and a removal rate of the conveyor; and subtracting the expected volume of material conveyed from the volume of material to be conveyed.

10. The non-transitory processor-readable storage medium of claim 8, wherein the set running state is a variable running state determined as a function of the updated volume of material to be conveyed, and wherein the running state comprises a rate of removal.

11. The non-transitory processor-readable storage medium of claim 8, wherein determining the current position of the tool comprises:

determining a trajectory of the tool based on a plurality of endpoints determined from a machining program;

determining a rate of travel of the tool from the machining program; and determining the current position of the tool based on a previous position of the tool, the determined trajectory, and the determined rate of travel of the tool.

12. The non-transitory processor-readable storage medium of claim 8, wherein the method further comprises:

receiving dimension and position parameters for the workpiece; and generating the workpiece model based on the received dimension and position parameters.

13. The non-transitory processor-readable storage medium of claim 12, wherein the generated workpiece model is a three-dimensional model comprising a plurality of elements, and wherein each iteration of the plurality of iterations further comprises updating the workpiece model by removing one or more elements of the plurality of elements based on the determined intersection of the tool model and the workpiece model.

14. The non-transitory processor-readable storage medium of claim 8, wherein the method further comprises:

receiving tool parameters for the tool; and generating the tool model based on the received tool parameters.

15. A machine tool control system, comprising:

a processor-readable storage medium storing instructions; and processor circuitry configured to execute the instructions stored in the processor-readable storage medium to perform a method of dynamic conveyor control comprising:

iteratively determining a volume of material to be conveyed by a conveyor, wherein each iteration of a plurality of iterations comprises:

determining a current position of a tool;

determining an intersection of a tool model representing the tool at the current position and a workpiece model representing a workpiece;

determining a nominal volume of material removed from the workpiece by the tool based on the intersection of the tool model and the workpiece model; and updating the volume of material to be conveyed based on the nominal volume of material removed from the workpiece and an operating state of the conveyor; and controlling the operating state of the conveyor based on the updated volume of material to be conveyed, wherein controlling the operating state of the conveyor comprises:

comparing the updated volume of material to be conveyed to a threshold value;

setting the operating state of the conveyor to a running state if the updated volume of material to be conveyed satisfies the threshold value; and setting the operating state of the conveyor to an idle state if the updated volume of material to be conveyed does not satisfy the threshold value.

16. The machine tool control system of claim 15, wherein updating the volume of material to be conveyed comprises:

adding the nominal volume of material removed from the workpiece to the volume of material to be conveyed;

determining an expected volume of material conveyed based on the operating state of the conveyor and a removal rate of the conveyor; and subtracting the expected volume of material conveyed from the volume of material to be conveyed.

17. The machine tool control system of claim 15, wherein the set running state is a variable running state determined as a function of the updated volume of material to be conveyed, and wherein the running state comprises a rate of removal.

18. The machine tool control system of claim 15, wherein determining the current position of the tool comprises:

determining a trajectory of the tool based on a plurality of endpoints determined from a machining program;

determining a rate of travel of the tool from the machining program; and determining the current position of the tool based on a previous position of the tool, the determined trajectory, and the determined rate of travel of the tool.

19. The machine tool control system of claim 15, wherein the method further comprises:

receiving dimension and position parameters for the workpiece; and generating the workpiece model based on the received dimension and position parameters.

20. The machine tool control system of claim 19, wherein the generated workpiece model is a three-dimensional model comprising a plurality of elements, and wherein each iteration of the plurality of iterations further comprises updating the workpiece model by removing one or more elements of the plurality of elements based on the determined intersection of the tool model and the workpiece model.

21. The machine tool control system of claim 15, wherein the method further comprises:

receiving tool parameters for the tool; and generating the tool model based on the received tool parameters.

* * * * *